(12) United States Patent
Barwin, III et al.

(10) Patent No.: US 9,104,832 B1
(45) Date of Patent: Aug. 11, 2015

(54) IDENTIFYING AND MITIGATING ELECTROMIGRATION FAILURES IN SIGNAL NETS OF AN INTEGRATED CIRCUIT CHIP DESIGN

(71) Applicant: International Business Machines Corporation, Armonk, NY (US)

(72) Inventors: John E. Barwin, III, Essex Junction, VT (US); Jason Chung, Williston, VT (US); Amol A. Joshi, Essex Junction, VT (US); William J. Livingstone, Underhill, VT (US); Leon J. Sigal, Monsey, NY (US); Brian Worth, Jericho, VT (US); Paul S. Zuchowski, Jericho, VT (US)

(73) Assignee: International Business Machines Corporation, Armonk, NY (US)

( * ) Notice: Subject to any disclaimer, the term of this patent is extended or adjusted under 35 U.S.C. 154(b) by 92 days.

(21) Appl. No.: 14/160,918

(22) Filed: Jan. 22, 2014

(51) Int. Cl.
   G06F 17/50 (2006.01)
(52) U.S. Cl.
   CPC ........ *G06F 17/5081* (2013.01); *G06F 17/5009* (2013.01)
(58) Field of Classification Search
   USPC ........................................................ 716/115
   See application file for complete search history.

(56) References Cited

U.S. PATENT DOCUMENTS

| | | |
|---|---|---|
| 6,038,383 A | 3/2000 | Young et al. |
| 6,249,898 B1 | 6/2001 | Koh et al. |
| 6,725,433 B1 | 4/2004 | Hau-Riege et al. |
| 6,857,113 B2 | 2/2005 | Gentry et al. |
| 6,954,914 B2 | 10/2005 | Sundar et al. |
| 6,993,446 B2 | 1/2006 | Gunawardana et al. |
| 7,315,992 B2 | 1/2008 | Bhooshan et al. |
| 7,454,316 B2 | 11/2008 | Bose et al. |
| 7,749,778 B2 | 7/2010 | Chanda et al. |
| 7,752,582 B2 | 7/2010 | Jain et al. |
| 7,971,171 B2 | 6/2011 | Keinert et al. |
| 8,219,953 B2 | 7/2012 | Jain et al. |
| 8,356,270 B2 * | 1/2013 | Burd et al. ............. 716/136 |
| 2004/0049750 A1 * | 3/2004 | Gentry et al. ............. 716/5 |
| 2014/0181780 A1 * | 6/2014 | Burd et al. ............. 716/136 |

OTHER PUBLICATIONS

Hunter, William R., "Self-Consistent Solutions for Allowed Interconnect Current Density—Part II: Application to Design Guidelines", Feb. 1997, IEEE Transactions on Electron Devices, vol. 44 No. 2, pp. 310-316.*

Seth, A., "Electromigration in Integrated Circuits," Workshop on Reliability and Physical Verification, Dec. 12, 2009, 46 pages.

(Continued)

*Primary Examiner* — Paul Dinh
*Assistant Examiner* — Bryce Aisaka
(74) *Attorney, Agent, or Firm* — Gibb & Riley, LLC

(57) ABSTRACT

A method of characterizing an electromigration (EM) parameter for use in an integrated circuit (IC) chip design including, inputting a layout of a wire layer and identifying a signal gate-circuit including electrically parallel paths, connected to an output of the signal gate from the layout. Based on widths for each of the paths, determining a maximum possible current for each of the paths, and calculating an average current for each of the paths. Identifying a path that is most limited in its current carrying capacity by possible EM failure mechanisms, and storing in a design library, a possible maximum current output to the identified limiting path, as the EM parameter.

20 Claims, 8 Drawing Sheets

(56) References Cited

OTHER PUBLICATIONS

NS, et al., "A Practical Approach to Static Signal Electromigration Analysis," 35th Design Automation Conference, 1998, 6 pages.

Saleh, et al., "Full-Chip Verification of UDSM Designs," ICCAD 1998 Proceedings of the 1998 IEEE/ACM International Conference on Computer-Aided Design, pp. 453-460.

Rochel, et al., "Full-Chip Signal Interconnect Analysis for Electromigration Reliability," ISQED2000 Proceedings of Quality Electronic Design, 2000, pp. 337-340.

Banerjee, et al., "Coupled Analysis of Electromigration Reliability and Performance in ULSI Signal Nets," Proceedings of the 2001 IEEE/ACM International Conference on Computer-Aided Design, 2001, pp. 158-164.

* cited by examiner

| Segment | W (um) From layout | IDC (mA) From circuit simulation | IDCmax (mA) From Tech DM | Ratio IDC/IDCmax | Parallel Path Uplift | IDCmax (mA) NSE |
|---|---|---|---|---|---|---|
| A | 0.12 | 0.04 | 0.072 | 0.56 | | |
| B | 0.08 | 0.025 | 0.043 | 0.58 | 1.875 | |
| C | 0.04 | 0.01 | 0.014 | 0.71 | 3 | |
| IDCtotal | | 0.075 | | | 7.5 | 0.105 |

IDENTIFYING AND MITIGATING ELECTROMIGRATION FAILURES IN SIGNAL NETS OF AN INTEGRATED CIRCUIT CHIP DESIGN

BACKGROUND

The present disclosure relates to methods for characterizing an electromigration (EM) parameter related to possible EM failures in signal nets of an integrated circuit (IC) chip design. More particularly, the present disclosure relates to using the EM parameter in an IC chip design flow.

As shown in FIG. 1, a suite of electronic design software tools 100 including tools for functional specification 110, circuit design 120, physical design 130, and verification/sign-off 140 are used in an IC chip design. The functional specification 110 of the IC chip is translated from a high level, logical language into a logic design. The logic design is then converted into a circuit design 120 that describes the exact behavior of digital circuits of the IC chip, as well as the interconnections to inputs and outputs of the digital circuits.

During physical design 130 all design components are instantiated with their geometric representations. The logic design is mapped to a netlist of logic gates of the target technology of the IC chip and the logic gates of the netlist are placed 132 at non-overlapping locations on the IC die. Iterative logical and placement transformations 134 of the logic gates in the semiconductor layers of the IC chip are used to close timing performance and power constraints for the IC chip. Interconnects, i.e., wires and vias, of the metal layers of the IC chip are next routed 136 to connect the logic gates of the netlist. A logic gate, and the wires and vias connected to the output of the logic gate form a signal gate-circuit or signal net. Post-routing optimization 138 of the signal interconnects, which seeks to mitigate possible failure mechanisms, enhances reliability of the IC chip design. Subsequent design for manufacturability can entail extensive error checking before final verification/sign-off 140 of the IC chip design.

One possible failure mechanism that can decrease the reliability of an IC chip design is electromigration (EM) in the wires and vias of the signal gate-circuits of the IC chip. Electromigration is due to momentum transfer from conducting electrons, flowing as a current in the wire, to the matrix of metal atoms of the wire, resulting in a gradual movement of the metal atoms over time. This gradual movement of metal atoms can result in two types of a circuit failure: a gap, i.e., an open circuit, developing in the wire as the metal atoms move away from a location of the wire; or a hillock, i.e., a short circuit, as the metal atoms pile up at a location and spread to touch nearby wires.

At the end of the 1960's, J. R. Black developed an empirical model to estimate the MTTF (mean time to failure) of a wire subject to electromigration, which is expressed by the following equation, $$MTTF = A(J^{-n})e^{\frac{E_g}{kT}},$$

where A is a constant based on the cross-sectional area of the wire, J is the current density, $E_a$ is the activation energy, k is the Boltzmann's constant, T is the temperature and n is a scaling factor, usually set to 2.

Signal nets or signal gate-circuits, including wires and vias of the metal layers, interconnect inputs and outputs of the logic gates of the semiconductor layers of the IC chip. A signal gate-circuit includes a signal gate, having specified electrical parameters, and segments of wires and vias connected to an output pin of the signal gate. The signal gate can be characterized by a maximum output capacitance that will provide a maximum output current into the load of the signal gate-circuit under optimal conditions. The physical layout of the signal gate-circuit includes placement of the output pin of the signal gate on the IC die relative to a metal layer and placement of each of the segments of wires and vias forming the signal gate-circuit of the metal layer.

There remains a need to characterize an electromigration (EM) parameter related to possible EM failures in signal nets of an integrated circuit (IC) chip design and to use the EM parameter in an IC chip design flow.

SUMMARY

In view of the foregoing, the disclosure may provide a computer-implemented method of characterizing an electromigration (EM) parameter for use in an integrated circuit (IC) chip design. The method may include inputting a layout of a wire layer from the IC chip design, and identifying a signal gate-circuit including a signal gate and segments of wires and vias, including electrically parallel paths, connected to an output of the signal gate from the layout of the wire layer. The method may also include simulating switching transitions of the signal gate-circuit, and based on widths for each of the segments, determining from stored data of a technology, a maximum current of each of the segments at a standard corner of a timing analysis. The method may further include calculating an average current output to each of the segments by the signal gate-circuit at the standard corner of the timing analysis, and computing an EM limiting current ratio by dividing the average current of each of the segments by the maximum current of each of the segments. The method may yet further include identifying an EM current limiter from each of the segments based on a highest value of the EM limiting current ratio, and computing a parallel paths uplift factor for a maximum EM current output by dividing a total average current output by the signal gate by the average current of the EM current limiter. Finally, the method may include storing in a design library, the maximum EM current output, which equals the parallel paths uplift factor multiplied by the maximum current of the EM current limiter.

The disclosure may provide a computer-implemented method for determining an electromigration (EM) checking limit for an integrated circuit (IC) design flow. The method may include inputting a layout of a wire layer from the IC chip design, and identifying a signal gate-circuit including a signal gate and segments of wires and vias, including electrically parallel paths, connected to an output of the signal gate from the layout of the wire layer. The method may also include reading a maximum output capacitance of the signal gate-circuit at optimal conditions from stored data of a technology, and reading a maximum EM current output for the signal gate-circuit, where the maximum EM current output is based on a product of a maximum current through an EM current limiter and a parallel paths uplift factor. The parallel paths uplift factor equals a total average current output by the signal gate divided by an average current of the EM current limiter, where the EM current limiter is identified by a highest value of an EM limiting current ratio, and the EM current limiting ratio equals an average simulated current of switching transitions into each of the segments at a standard corner of a timing analysis divided by a maximum current determined from the stored data of the technology of each of the segments at the standard corner of the timing analysis. The method may further include correlating the maximum EM current output by the signal gate to a maximum EM output capacitance of the signal gate. Finally, the method may include selecting a lesser value of the maximum output capacitance of the signal gate at the optimal conditions and the maximum EM output capacitance of the signal gate to be stored as the EM checking limit of the signal gate in a design library for the IC chip design flow.

The disclosure may provide another computer-implemented method for determining an electromigration (EM) checking limit for an integrated circuit (IC) design flow. The method may include inputting a layout of a wire layer from the IC chip design, and identifying a signal gate-circuit including a signal gate and segments of wires and vias, including electrically parallel paths, connected to an output of the signal gate from the layout of the wire layer. The method may also include reading a maximum output capacitance for the signal gate-circuit at optimal conditions from stored data of a technology, and based on widths for each of the segments, determining from the stored data of a technology, a maximum current of each of the segments at a standard corner of a timing analysis. The method may further include simulating switching transitions of the signal gate-circuit, and based on the maximum output capacitance, calculating an average current output to each of the segments. The method may yet further include calculating an average current output to each of the segments by the signal gate-circuit based on the maximum output capacitance, and computing an EM limiting current ratio by dividing the average current of each of the segments by the maximum current of each of the segments. The method may yet further include identifying an EM current limiter from the segments based on a highest value of the EM limiting current ratio, and computing a parallel paths uplift factor for a maximum EM current output by dividing a total average current output by the signal gate by the average current of the EM current limiter. The method may yet further include storing in a design library, the maximum EM current output, which equals the parallel paths uplift factor multiplied by the maximum current of the EM limiter, and correlating the maximum EM current output by the signal gate to a maximum EM output capacitance of the signal gate. Finally, the method may include selecting a lesser value of the maximum output capacitance of the signal gate at the optimal conditions and the maximum EM output capacitance, to be stored as the EM checking limit of the signal gate in the design library for the IC chip design flow.

BRIEF DESCRIPTION OF THE DRAWINGS

The methods of the disclosure herein will be better understood from the following detailed description with reference to the drawings, which are not necessarily drawn to scale and in which.

DETAILED DESCRIPTION

Figure 1:
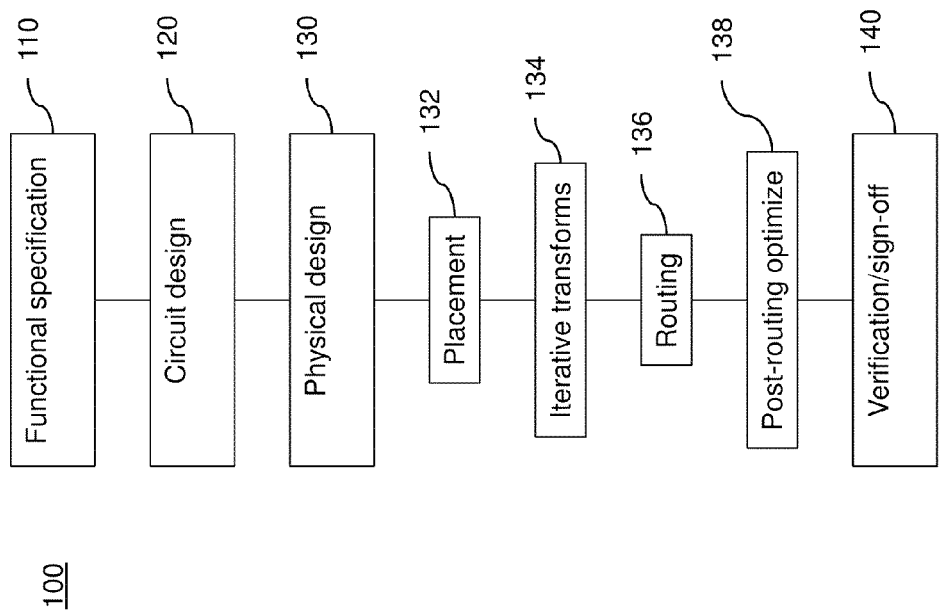
FIG. 1 illustrates a flowchart 100 of a suite of electronic design software tools used in an IC chip design flow in the related art.

The exemplary methods of the disclosure and their various features and advantageous details are explained more fully with reference to the non-limiting exemplary methods that are illustrated in the accompanying drawings and detailed in the following description. It should be noted that the features illustrated in the drawings are not necessarily drawn to scale. Descriptions of well-known materials, components, and processing techniques are omitted so as to not unnecessarily obscure the exemplary methods, systems and products of the disclosure. The examples used herein are intended to merely facilitate an understanding of ways in which the exemplary methods of the disclosure may be practiced and to further enable those of skill in the art to practice the exemplary methods of the disclosure. Accordingly, the examples should not be construed as limiting the scope of the exemplary methods of the disclosure.

As stated above, there remains a need to identify an electromigration (EM) parameter related to possible EM failures in signal nets of an integrated circuit (IC) chip design, and to use the EM parameter in an IC chip design flow.

In the design flow of an IC chip, the placement of the logic gates of a signal net, i.e., the signal gates, is followed by the routing of interconnects, including wires and vias, of the metal layers to connect the signal gates of the logical netlist. The resultant routing may provide a physical layout of a signal gate-circuit that comprises a signal gate and each of the segments of wires and vias, including electrically parallel paths, in a wire layer that are connected to an output of the signal gate in the IC chip design.

Figure 2:
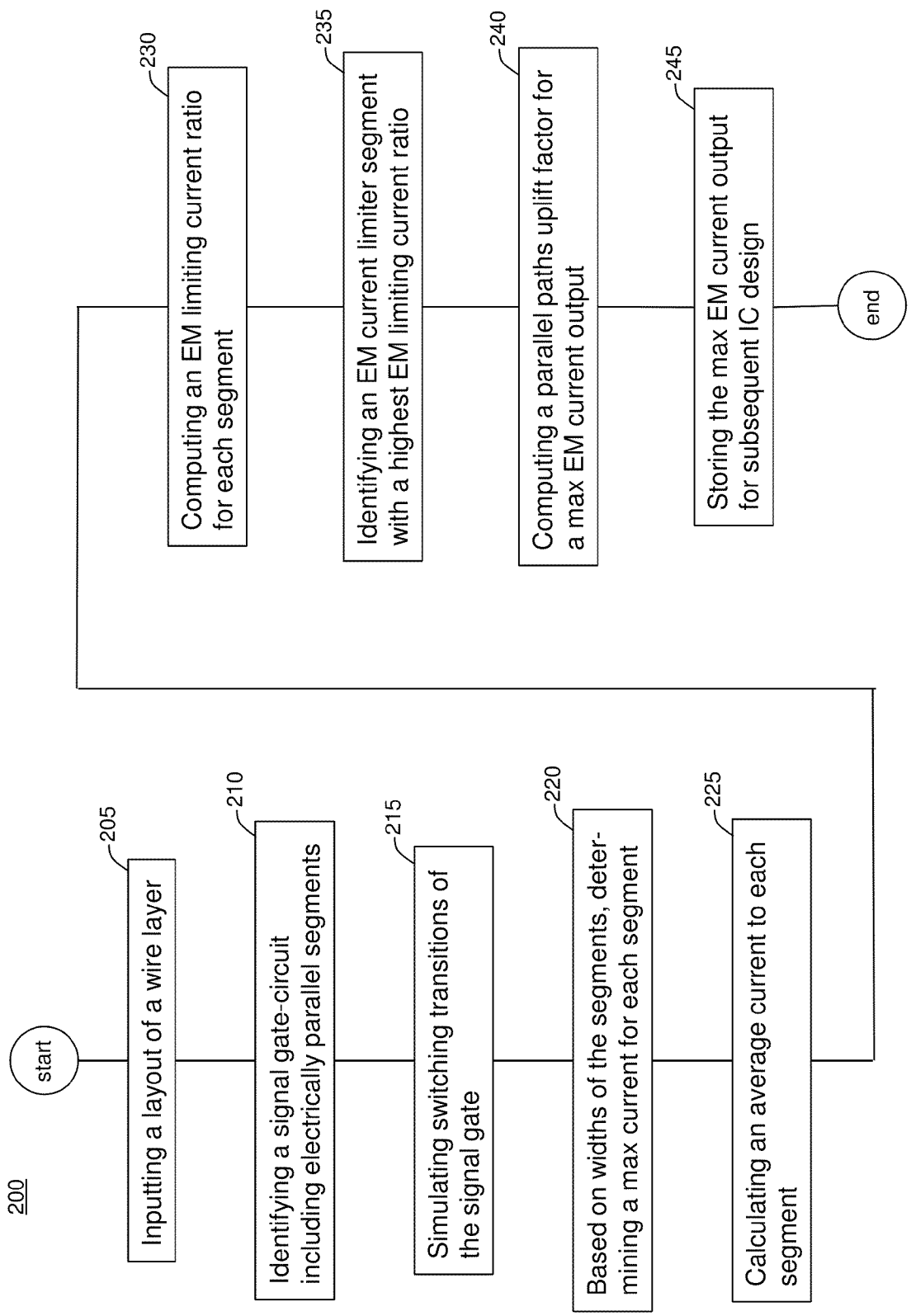
FIG. 2 illustrates a flowchart 200 of a computer-implemented method for characterizing an electromigration (EM) parameter for use in an IC chip design.

Referring to FIG. 2, a flowchart 200 illustrates a computer-implemented method that may characterize an electromigration (EM) parameter for use in an IC chip design. The method may include accessing and inputting a physical layout of a wire layer from an initial IC chip design to a computer program that implements the method of characterizing the EM parameter for use in an IC chip design, 205. A signal gate-circuit including a signal gate and segments of wires and vias, including electrically parallel paths, connected to an output of the signal gate may be identified from the physical layout of the wire layer, 210.

In the method, switching transitions of the signal gate-circuit may be simulated, where the switching transitions include a first transition from a first voltage, corresponding to a logical 0, to a second voltage, corresponding to a logical 1, and a second transition from the second voltage to the first voltage, 215. The simulation of the switching transitions for the signal gate-circuit may be performed at environmental parameters, including voltage, temperature and power-on-hours, corresponding to that of a standard corner of a timing analysis.

In the method, each segment of wires and vias may be characterized by one width, from a selection of possible design widths used by the initial IC chip design, and a height corresponding to the dimensions of the metal layer; thus, providing a cross-sectional area for each segment of the wires and vias. Using data of the technology for the IC chip design, e.g., an electronically stored Technology Design Manual, a maximum current or maximum current density carried by each of the segments of the wires and vias may be determined at environmental parameters, corresponding to that of the standard corner of the timing analysis used for simulations, 220.

In the method, an average current output may be calculated for each of the segments of wires and vias of a signal gate-circuit at the environmental parameters, corresponding to the standard corner of the timing analysis, 225. The average current may be based on a switching factor that depends on a frequency of the switching transitions and a percentage of operational time during which the switching transitions occur. Alternatively, the average current may be based on the simulation of the switching transitions into each of the segments of the wires and vias of the signal gate-circuit at the standard corner of the timing analysis.

In the method, a limiting current ratio, indicative of a possibility of an EM failure, that is, an EM limiting current ratio, may be computed by dividing the average current flow of each segment of the wires and vias at the environmental parameters corresponding to the standard corner of the timing analysis, by the maximum current flow for each segment of the wires and vias determined from the data of the technology for the IC chip for the environmental parameters corresponding to the standard corner of the timing analysis, 230. A high value of the EM limiting current ratio for a segment of the wires and vias may indicate that the segment is close to carrying it maximal amount of current or is more limited in its current carrying capacity by the possibility of an EM failure mechanism at the environmental parameters corresponding to the standard corner of the timing analysis. The segment of the wires and vias with the highest value of the EM limiting current ratio, i.e., the EM current limiter, may be the most limited in its current carrying capacity by the possibility of an EM failure mechanism, and thus, most susceptible to EM failure of the segments of wires and vias connected to the output of a signal gate in the metal layer, 235.

In some layouts of the signal gate-circuit, all of the current to charge/discharge a load capacitance may flow through a single segment associated with the EM current limiter. Therefore, the maximum EM current output or maximum EM current density output carried by the EM limiter may be determined from the stored data of the technology, as described above. However, this is not always the case. In the case of a layout where the EM limiter may be associated with more than one segment, and where each of these more than one segments may be electrically parallel, the maximum EM current output carried by the more than one electrically parallel EM limiter segments may be determined by multiplying the maximum current carried by a single EM limiter by a parallel paths uplift factor equal to the number of parallel paths.

Returning to FIG. 2, the method may include dividing a total average current output by the signal gate by the amount of average current carried by the current limiter to provide a parallel paths uplift factor for the maximum EM current output, 240. Finally, the maximum EM current output, which equals the parallel paths uplift factor multiplied by the maximum current of the EM limiter may be stored in the design library, 245, as a non-standard extension of a Liberty model, for subsequent IC design.

Figures 3A, 3B:
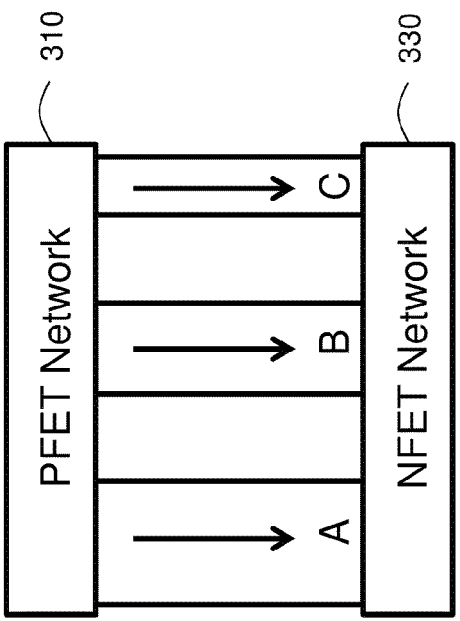
FIG. 3A is a schematic diagram illustrating an example of an IC chip design by which the computer-implemented method of FIG. 2 may characterize the EM parameter.
FIG. 3B is a table illustrating exemplary values of widths, currents and current ratios of the IC chip design of FIG. 3A that are used to characterize the EM parameter provided by the computer-implemented method of FIG. 2.

An exemplary layout of a wire layer from an IC chip design, which is illustrated in FIG. 3A, may provide an example of the method of characterizing an electromigration (EM) parameter for use in an IC chip design, described above. Interconnect segments A, B, and C, of the wire layer may connect the output of a signal gate-circuit, i.e., a P-FET network 310, to the load, i.e., an N-FET network 330. Segments A, B, and C may have different widths, as shown in the table of FIG. 3B. A circuit simulation performed on the signal gate-circuit of FIG. 3A may provide average currents output to each of the segments at a standard corner of the timing analysis. Maximum currents for each of the segments, based on their widths, may be determined from the stored data of a technology, e.g., a Technical Design Manual, as shown in FIG. 3B. The total average current output by the signal gate-circuit may equal the sum of the average current outputs for each of segments A, B, and C, i.e., 0.075. The EM current limiting ratio for each of segments A, B, and C may equal the average current of each of the segments output divided by the maximum current for each of the segments. As shown by the table of FIG. 3B, segment C has the highest value of the EM current limiting ratio, i.e., 0.71, and may be identified as the EM current limiter. A parallel paths uplift factor for a maximum EM output current for the EM limiter, i.e., segment C, may be computed by dividing the total average current output of the signal gate by the average current of the EM limiter, i.e., 0.075/0.01=7.5, as shown in the table of FIG. 3B. Parallel paths uplift factors for each of the segments may be determined by dividing the total average current output by the average current of each of the respective segments. The maximum EM current output for the EM limiter of the layout of FIG. 3A, i.e., segment C, may equal the parallel paths uplift factor for segment C, i.e., 7.5, multiplied by the maximum current of segment C, i.e., 0.014, to yield a maximum EM current output of 0.105, as shown in the table of FIG. 3B.

The computer-implemented method for characterizing an electromigration (EM) parameter for use in an IC chip design, described above, may further include determining from the stored data of the technology, a maximum root-mean-square (RMS) current of each of the segments, based on the widths of each of the segments, at the standard corner of the timing analysis. The method may also include calculating an average RMS current output to each of the segments at the standard corner of the timing analysis, and computing an RMS EM current limiting ratio by dividing the average RMS current of each of the segments by the maximum RMS current of each of the segments. The method may further include identifying an RMS EM current limiter of the segments based on a highest value of the RMS EM limiting ratio, and computing an RMS parallel paths uplift factor for a maximum RMS EM current output, used for validating constraints on Joule heating, by dividing a total RMS current output by the signal gate by the average RMS current of the RMS EM limiter. Finally, the method may include storing in the design library, the maximum RMS EM current output, which equals the RMS parallel paths uplift factor multiplied by the maximum RMS current of the RMS EM current limiter.

The computer-implemented method for characterizing an electromigration (EM) parameter for use in an IC chip design, described above, may yet further include determining from the stored data of the technology, a maximum peak current of each of the segments, based on the widths of each of the segments, at the standard corner of the timing analysis. The method may also include calculating an average peak current output to each of the segments at the standard corner of the timing analysis, and computing a peak EM current limiting ratio by dividing the average peak current of each of the segments by the maximum peak current of each of the segments. The method may further include identifying a peak EM current limiter of the segments based on a highest value of the peak EM limiting ratio, and computing a peak parallel paths uplift factor for a maximum peak EM current output, used for validating constraints on power, by dividing a total peak current output by the signal gate by the average peak current of the peak EM limiter. Finally, the method may include storing in the design library, the maximum peak EM current output, which equals the peak parallel paths uplift factor multiplied by the maximum peak current of the peak EM current limiter.

Figure 4:
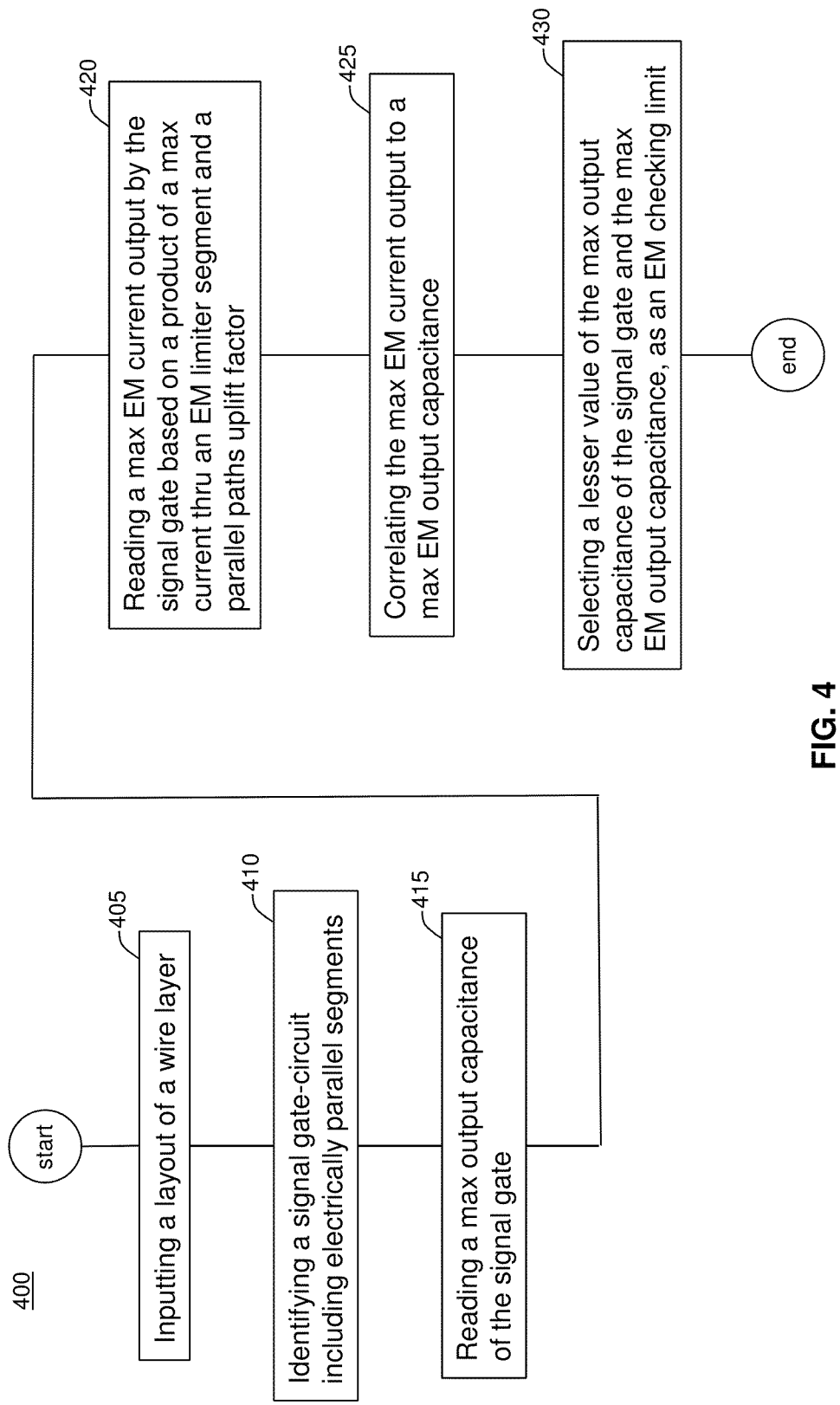
FIG. 4 illustrates a flowchart 400 of a computer-implemented method for determining an electromigration (EM) checking limit for an integrated circuit (IC) design flow.

Referring to FIG. 4, a flowchart 400 illustrates a computer-implemented method that may determine an electromigration (EM) checking limit for an IC chip design flow, based on a previously characterized and stored EM parameter, i.e., a maximum EM current output, for a signal gate-circuit of the IC chip design. The method may include accessing and inputting a physical layout of a wire layer from an initial or existing IC chip design to a computer program that implements the method of determining an EM checking limit for the IC chip design flow, 405. In the method, a signal gate-circuit including a signal gate and segments of wires and vias, including electrically parallel paths, connected to an output of the signal gate may be identified from the physical layout of the wire layer, 410.

In the method, a maximum output capacitance of the signal gate under optimal conditions may be read from stored data of a technology, e.g., an electronically stored value of the maximum output capacitance based on a Liberty timing model characterized by data/slew equations for the signal gate, 415.

In the method, the maximum EM current output for the signal gate-circuit that is stored in the design library may be read, where the maximum EM current output may be based on a product of a parallel paths uplift factor and a maximum current through an EM current limiter, 420. The maximum EM current output by said signal gate may be stored in the design library as a non-standard extension of a Liberty model. The parallel paths uplift factor may equal a total average current output by the signal gate divided by an average current of the EM current limiter. The EM current limiter may be identified by a highest value of an EM limiting current ratio, which equals an average simulated current of switching transitions into each of the segments of the wire layer of the layout at a standard corner of a timing analysis divided by a maximum current determined from the stored data of the technology of each of the segments at the standard corner of the timing analysis. The average current may be based on a switching factor dependent on a frequency of the switching transitions and a percentage of time during which the switching transitions occur. Alternatively, the average current may be based on the simulating of the switching transitions. The stored data of the technology may include a maximum current for each of the segments at parameters including voltage, temperature, and power-on-hours of the standard corner of the timing analysis.

In the method, the maximum EM current output by the signal gate may be correlated to a maximum EM output capacitance of the signal gate, 425. As is known in the art, current and capacitance are related by the equation, $I=C*V*F$, where I equals current, C equals capacitance, V equals voltage, and F equals frequency. Each signal gate-circuit may be characterized by a maximum EM current output for a voltage and frequency, used by the signal gate-circuit, in the IC chip design. Once voltage and frequency are determined by the IC chip design, the maximum EM output capacitance may be computed based on the maximum EM current output.

Finally, a lesser value of the maximum output capacitance of the signal gate under the optimal conditions and the maximum EM output capacitance of the signal gate may be selected to be stored as the EM checking limit of the signal gate in the design library for the IC chip design flow, 430. The EM checking limit may be used in subsequent design iterations and may save time in post optimization violation clean-up and final verification/sign-off of the IC chip design.

The computer-implemented method for determining an electromigration (EM) checking limit for an IC chip design flow, described above, may further include reading the EM checking limit of the signal gate stored in the design library, and simulating the switching transitions of the signal gate-circuit, based on an output capacitance value of the signal gate equal to the EM checking limit, to calculate an iterated average current output to each of the segments at the standard corner of the timing analysis. The iterated average current may be based on a switching factor dependent on a frequency of the switching transitions and a percentage of time during which the switching transitions occur. Alternatively, the iterated average current may be based on the simulating of the switching transitions. The method may also include computing an iterated EM limiting current ratio by dividing the iterated average current of each of the segments by the maximum current determined from the stored data of the technology for each of the segments at the standard corner of the timing analysis. The method may further include identifying an iterated EM current limiter from the segments based on a highest value of the iterated EM limiting current ratio, and computing an iterated parallel paths uplift factor for an iterated maximum EM current output by dividing a total average current output by the signal gate by the iterated average current of the iterated EM current limiter. The method may also included computing the maximum EM current output, which equals the iterated parallel paths uplift factor multiplied by the maximum current of the iterated EM current limiter. Finally, the method may yet further include correlating the iterated maximum EM current output to an iterated maximum EM output capacitance of the signal gate, and storing a lesser value of the previously-stored EM checking limit and the iterated maximum EM output capacitance, as a new EM checking limit of the signal gate in the design library the IC chip design flow. The iterated maximum EM current output by the signal gate may also be stored in the design library as a non-standard extension of a Liberty model.

Figure 5:
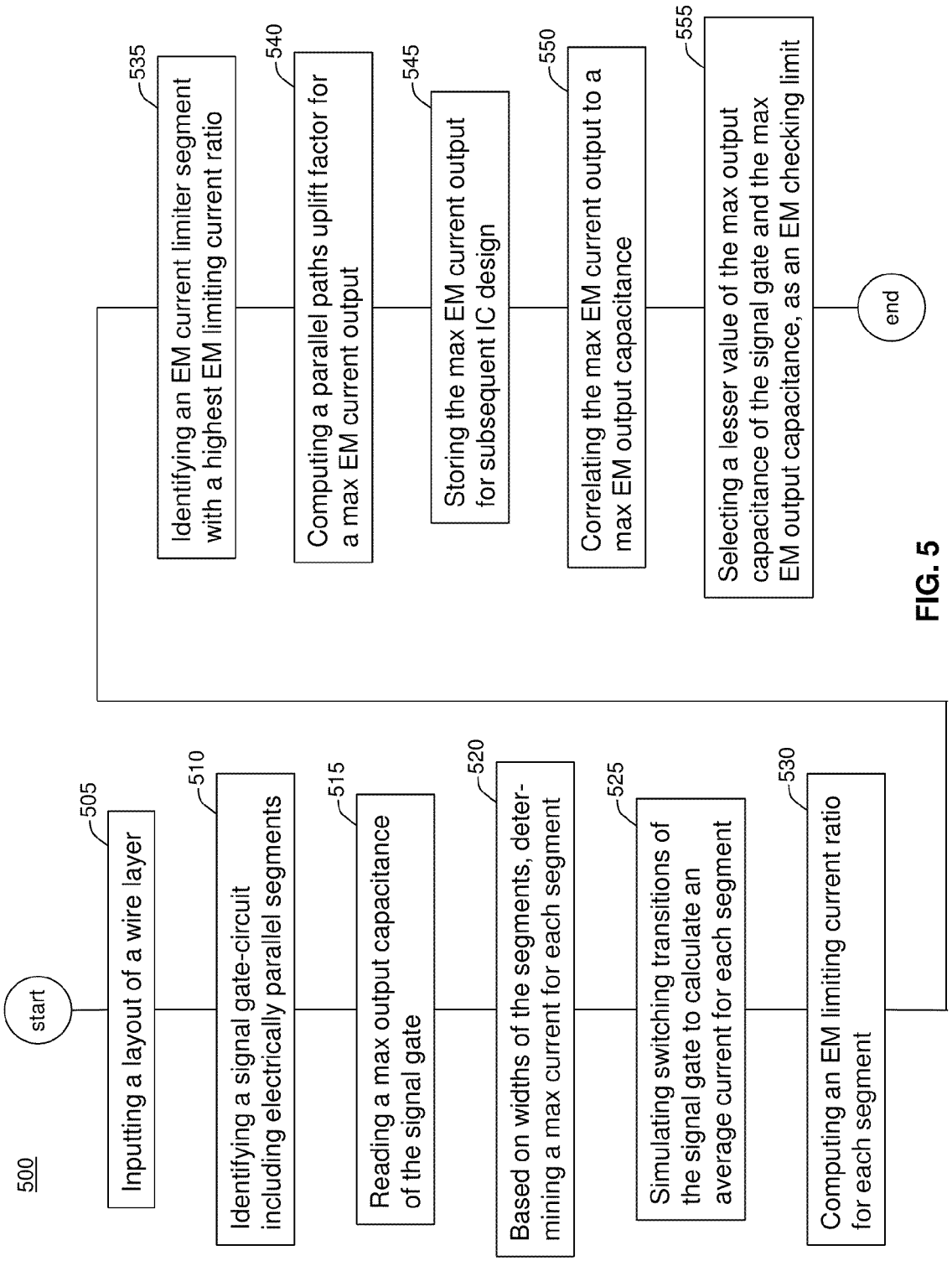
FIG. 5 illustrates a flowchart 500 of another computer-implemented method for determining an electromigration (EM) checking limit for an integrated circuit (IC) design flow.

Referring to FIG. 5, a flowchart 500 illustrates another computer-implemented method that may determine an electromigration (EM) checking limit for an IC chip design flow, based on a previously characterized and stored EM parameter, i.e., a maximum EM current output, for a signal gate-circuit of the IC chip design. The method may include accessing and inputting a physical layout of a wire layer from an initial or existing IC chip design to a computer program that implements the method of determining an EM checking limit for the IC chip design flow, 505. In the method, a signal gate-circuit including a signal gate and segments of wires and vias, including electrically parallel paths, connected to an output of the signal gate may be identified from the physical layout of the wire layer, 510.

In the method, a maximum output capacitance of the signal gate under optimal conditions may be read from stored data of a technology, e.g., an electronically stored value of the maximum output capacitance based on a Liberty timing model characterized by data/slew equations for the signal gate, 515.

In the method, each segment of wires and vias may be characterized by one width, from a selection of possible design widths used by the IC chip design, and a height corresponding to the dimensions of the metal layer; thus, providing a cross-sectional area for each segment of the wires and vias. Using data of the technology for the IC chip design, e.g., an electronically stored Technology Design Manual, a maximum current or maximum current density carried by each of the segments of the wires and vias may be determined at environmental parameters, corresponding to that of the standard corner of the timing analysis used for simulations, 520.

In the method, switching transitions of the signal gate-circuit may be simulated, based on the maximum output capacitance of the signal gate, to calculate an average current output to each of the segments, 525. The switching transitions include a first transition from a first voltage, corresponding to a logical 0, to a second voltage, corresponding to a logical 1, and a second transition from the second voltage to the first voltage. The simulation of the switching transitions for the signal gate-circuit may be performed at environmental parameters, including voltage, temperature and power-on-hours, corresponding to that of a standard corner of a timing analysis. The average current may be based on a switching factor that depends on a frequency of the switching transitions and a percentage of operational time during which the switching transitions occur. Alternatively, the average current may be based on the simulation of the switching transitions into each of the segments of the wires and vias of the signal gate-circuit at the standard corner of the timing analysis.

In the method, a limiting current ratio, indicative of a possibility of an EM failure, that is, an EM limiting current ratio, may be computed by dividing the average current flow of each segment of the wires and vias at the environmental parameters corresponding to the standard corner of the timing analysis, by the maximum current flow for each segment of the wires and vias determined from the data of the technology for the IC chip for the environmental parameters corresponding to the standard corner of the timing analysis, 530. A high value of the EM limiting current ratio for a segment of the wires and vias may indicate that the segment is close to carrying it maximal amount of current or is more limited in its current carrying capacity by the possibility of an EM failure mechanism at the environmental parameters corresponding to the standard corner of the timing analysis. The segment of the wires and vias with the highest value of the EM limiting current ratio, i.e., the EM current limiter, may be the most limited in its current carrying capacity by the possibility of an EM failure mechanism, and thus, most susceptible to EM failure of the segments of wires and vias connected to the output of a signal gate in the metal layer, 535.

The method may also include dividing a total average current output by the signal gate by the amount of average current carried by the current limiter to provide a parallel paths uplift factor for a maximum EM current output, 540. In the method, the maximum EM current output, which equals the parallel paths uplift factor multiplied by the maximum current of the EM limiter may be stored in the design library, 545, as a non-standard extension of a Liberty model.

In the method, the maximum EM current output by the signal gate may be correlated to a maximum EM output capacitance of the signal gate, 550. Finally, a lesser value of the maximum output capacitance of the signal gate under the optimal conditions and the maximum EM output capacitance may be selected to be stored as the EM checking limit of the signal gate in the design library for the IC chip design flow, 555, as a non-standard extension of a Liberty model. The EM checking limit may be used in subsequent design iterations and may save time in post optimization violation clean-up and final verification/sign-off of the IC chip design.

The computer-implemented method outlined by the flowchart 500 of FIG. 5 may further include reading the EM checking limit of the signal gate stored in the design library, and simulating the switching transitions of the signal gate, based on an output capacitance value equal to the EM checking limit, to calculate an iterated average current output to each of the segments at said standard corner of said timing analysis. This method may also include computing an iterated EM limiting current ratio by dividing the iterated average current of each of the segments by the maximum current determined from the stored data of the technology of each of the segments at the standard corner of the timing analysis. This method may further include identifying an iterated EM current limiter from the segments based on a highest value of the iterated EM limiting current ratio, and computing an iterated parallel paths uplift factor for an iterated maximum EM current output by dividing a total average current output by the iterated average current of the iterated EM current limiter. This method may yet further include computing the iterated maximum EM current output, which equals the iterated parallel paths uplift factor multiplied by the maximum current of the iterated EM limiter, and correlating the iterated maximum EM current output to an iterated maximum EM output capacitance of the signal gate. Finally, this method may include storing a lesser value of the EM checking limit and the iterated maximum EM output capacitance, as a new EM checking limit of the signal gate in the design library for said IC chip design flow.

As will be appreciated by one skilled in the art, aspects of the systems and methods herein may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable non-transitory medium(s) may be utilized. The computer readable medium may be a computer readable signal medium or a computer readable storage medium. The non-transitory computer storage medium stores instructions, and a processor executes the instructions to perform the methods described herein. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments herein. It will be understood that each block of the flowchart illustrations and/or two-dimensional block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 6:
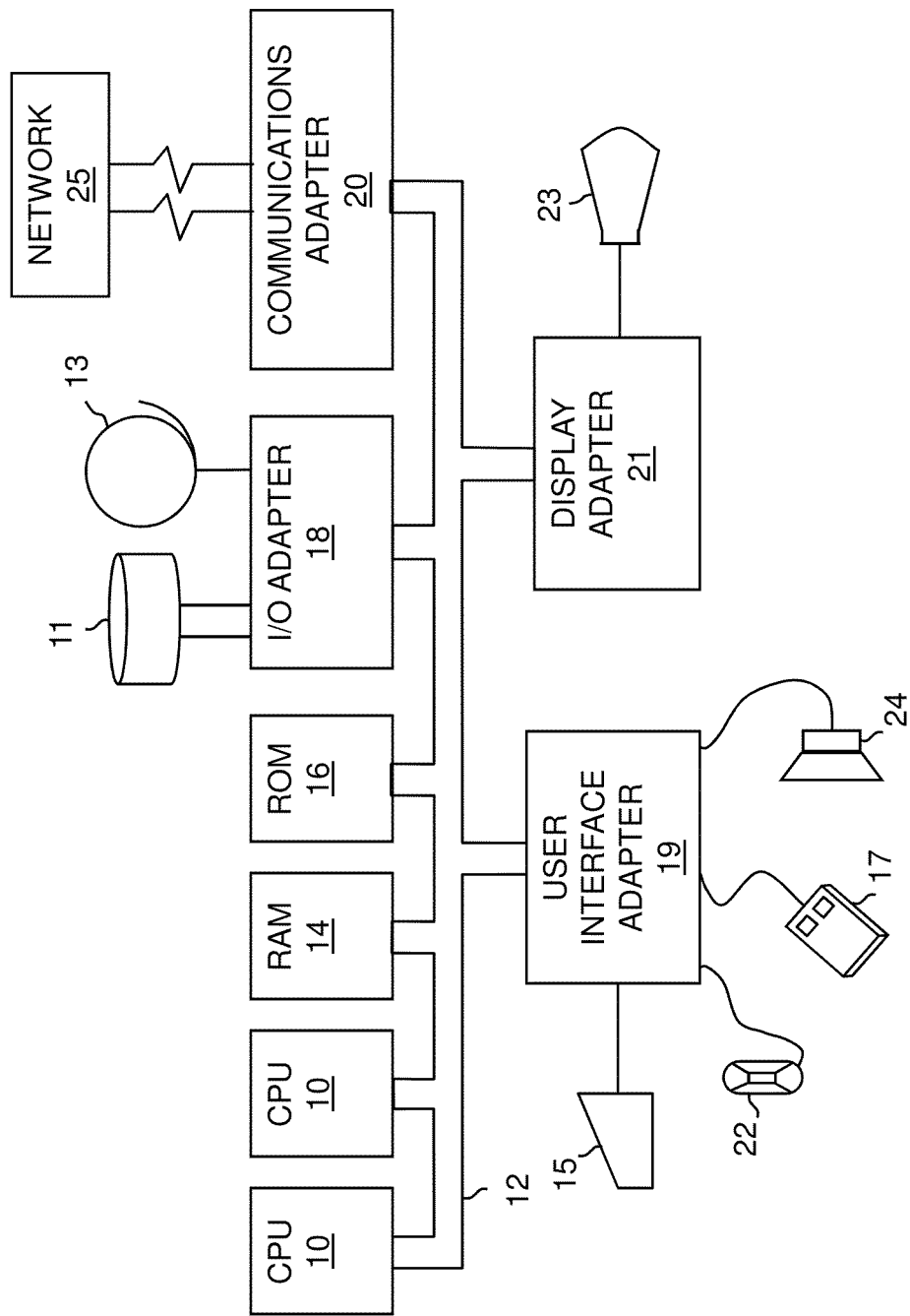
FIG. 6 is a schematic diagram of a hardware system according to embodiments herein.

A representative hardware environment for practicing the embodiments herein is depicted in FIG. 6. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The flowchart and block diagrams in the Figures illustrate the architecture, functionality, and operation of possible implementations of systems, methods and computer program products according to various embodiments herein. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Deployment Types include loading directly in the client, server and proxy computers via loading a storage medium such as a CD, DVD, etc. The process software may also be automatically or semi-automatically deployed into a computer system by sending the process software to a central server or a group of central servers. The process software is then downloaded into the client computers that will execute the process software. The process software is sent directly to the client system via e-mail. The process software is then either detached to a directory or loaded into a directory by a button on the e-mail that executes a program that detaches the process software into a directory. Send the process software directly to a directory on the client computer hard drive. When there are proxy servers, the process will, select the proxy server code, determine on which computers to place the proxy servers' code, transmit the proxy server code, and then install the proxy server code on the proxy computer. The process software will be transmitted to the proxy server then stored on the proxy server.

While it is understood that the process software may be deployed by manually loading directly in the client, server and proxy computers via loading a storage medium such as a CD, DVD, etc., the process software may also be automatically or semi-automatically deployed into a computer system by sending the process software to a central server or a group of central servers. The process software is then downloaded into the client computers that will execute the process software. Alternatively the process software is sent directly to the client system via e-mail. The process software is then either detached to a directory or loaded into a directory by a button on the e-mail that executes a program that detaches the process software into a directory. Another alternative is to send the process software directly to a directory on the client computer hard drive. When there are proxy servers, the process will, select the proxy server code, determine on which computers to place the proxy servers' code, transmit the proxy server code, then install the proxy server code on the proxy computer. The process software will be transmitted to the proxy server then stored on the proxy server.

Figure 7:
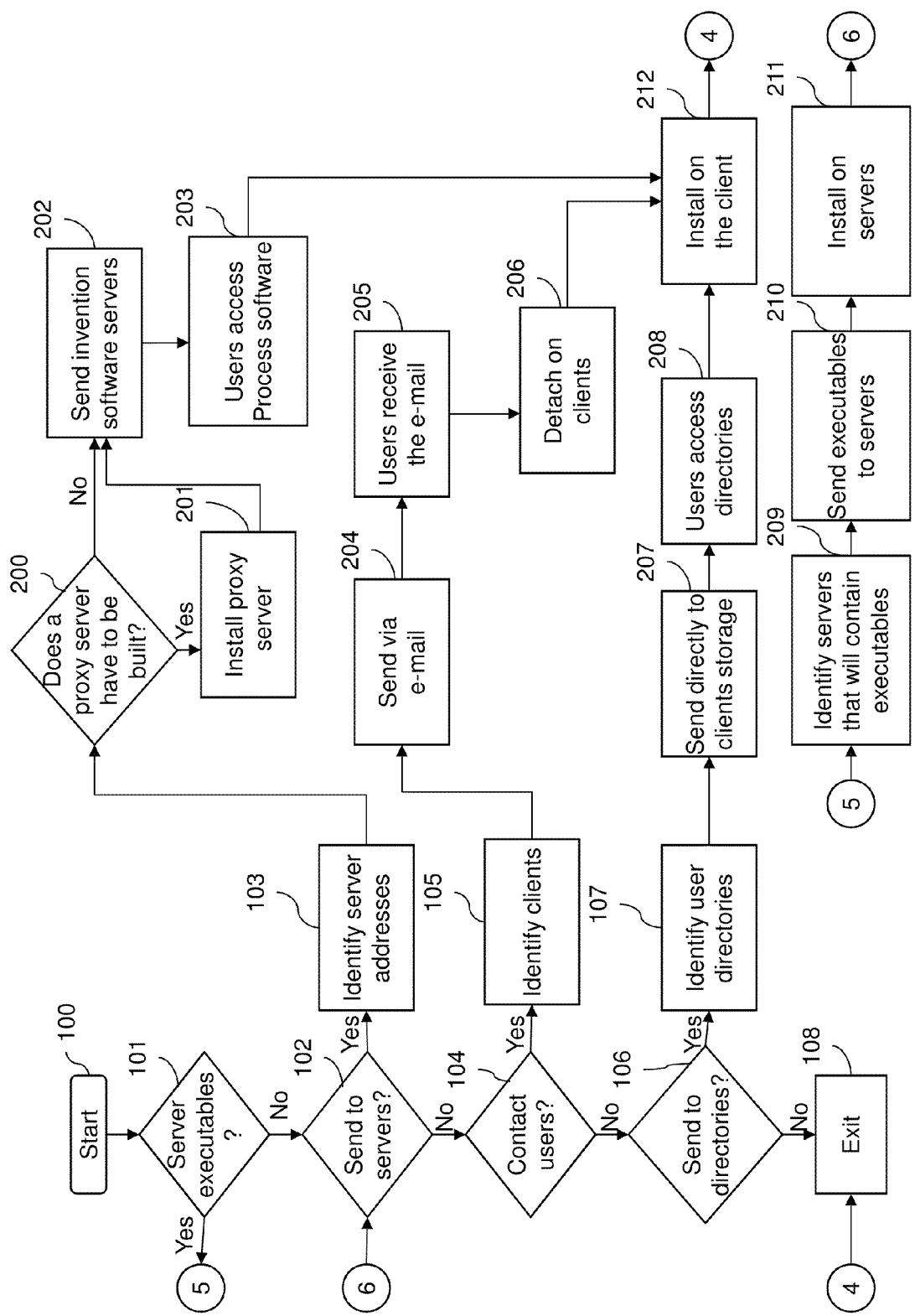
FIG. 7 is a schematic diagram of a deployment system according to embodiments herein.

In FIG. 7, Step 100 begins the deployment of the process software. The first thing is to determine if there are any programs that will reside on a server or servers when the process software is executed 101. If this is the case then the servers that will contain the executables are identified 209. The process software for the server or servers is transferred directly to the servers' storage via FTP or some other protocol or by copying though the use of a shared file system 210. The process software is then installed on the servers 211.

Next, a determination is made on whether the process software is be deployed by having users access the process software on a server or servers 102. If the users are to access the process software on servers then the server addresses that will store the process software are identified 103.

A determination is made if a proxy server is to be built 200 to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required then the proxy server is installed 201. The process software is sent to the servers either via a protocol such as FTP or it is copied directly from the source files to the server files via file sharing 202. Another embodiment would be to send a transaction to the servers that contained the process software and have the server process the transaction, then receive and copy the process software to the server's file system. Once the process software is stored at the servers, the users via their client computers, then access the process software on the servers and copy to their client computers file systems 203. Another embodiment is to have the servers automatically copy the process software to each client and then run the installation program for the process software at each client computer. The user executes the program that installs the process software on his client computer 212 then exits the process 108.

In step 104 a determination is made whether the process software is to be deployed by sending the process software to users via e-mail. The set of users where the process software will be deployed are identified together with the addresses of the user client computers 105. The process software is sent via e-mail to each of the users' client computers. The users then receive the e-mail 205 and then detach the process software from the e-mail to a directory on their client computers 206. The user executes the program that installs the process software on his client computer 212 then exits the process 108.

Lastly a determination is made on whether to the process software will be sent directly to user directories on their client computers 106. If so, the user directories are identified 107. The process software is transferred directly to the user's client computer directory 207. This can be done in several ways such as but not limited to sharing of the file system directories and then copying from the sender's file system to the recipient user's file system or alternatively using a transfer protocol such as File Transfer Protocol (FTP). The users access the directories on their client file systems in preparation for installing the process software 208. The user executes the program that installs the process software on his client computer 212 then exits the process 108.

The process software is integrated into a client, server and network environment by providing for the process software to coexist with applications, operating systems and network operating systems software and then installing the process software on the clients and servers in the environment where the process software will function.

The first step is to identify any software on the clients and servers including the network operating system where the process software will be deployed that are required by the process software or that work in conjunction with the process software. This includes the network operating system that is software that enhances a basic operating system by adding networking features.

Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists matches the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

Figure 8:
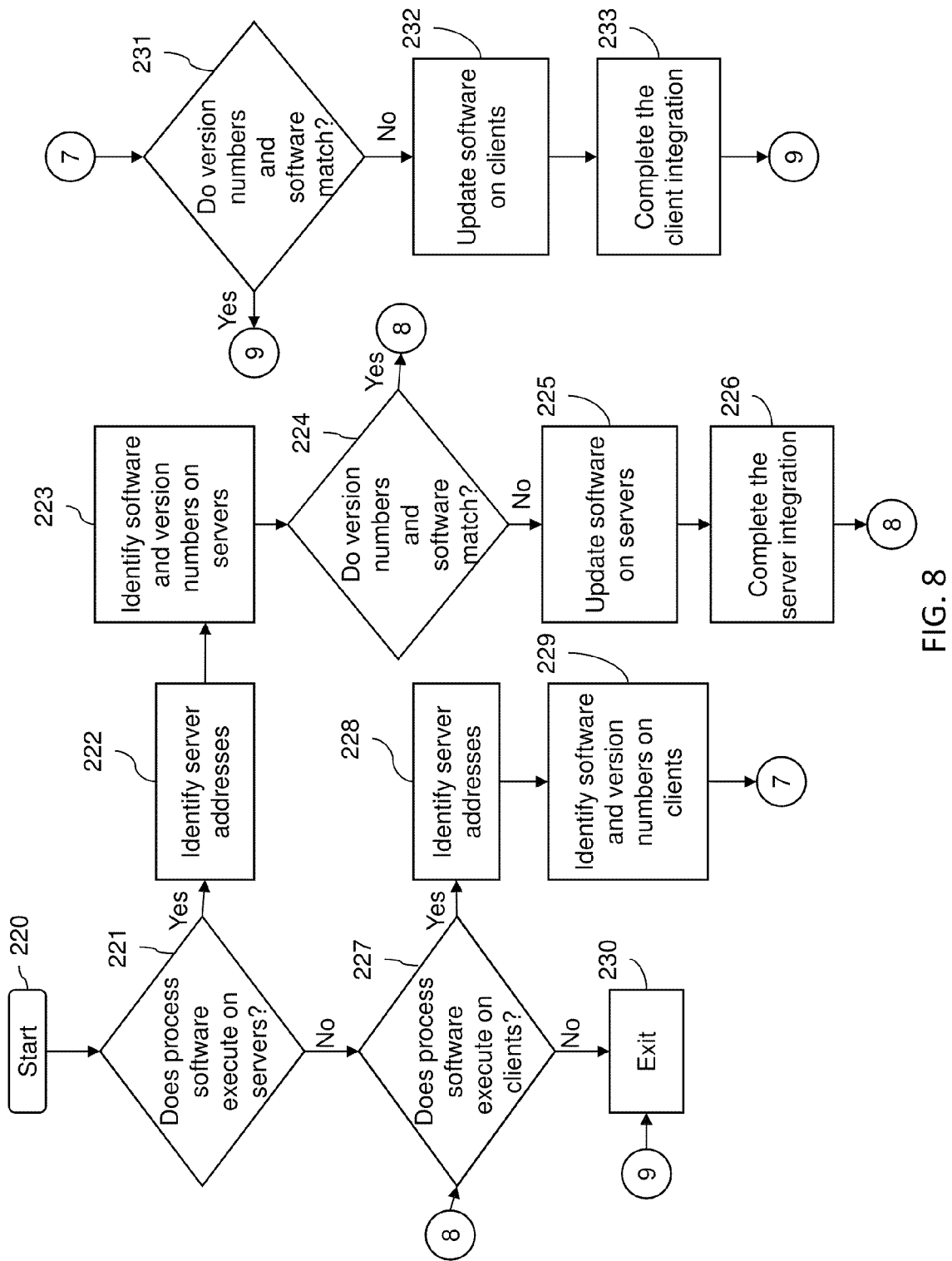
FIG. 8 is a schematic diagram of an integration system according to embodiments herein.

In FIG. 8, Step 220 begins the integration of the process software. The first thing is to determine if there are any process software programs that will execute on a server or servers 221. If this is not the case, then integration proceeds to 227. If this is the case, then the server addresses are identified 222. The servers are checked to see if they contain software that includes the operating system (OS), applications, and network operating systems (NOS), together with their version numbers, that have been tested with the process software 223. The servers are also checked to determine if there is any missing software that is required by the process software 223.

A determination is made if the version numbers match the version numbers of OS, applications and NOS that have been tested with the process software 224. If all of the versions match and there is no missing required software the integration continues in 227.

If one or more of the version numbers do not match, then the unmatched versions are updated on the server or servers with the correct versions 225. Additionally if there is missing required software, then it is updated on the server or servers 225. The server integration is completed by installing the process software 226.

Step 227 which follows either 221, 224 or 226 determines if there are any programs of the process software that will execute on the clients. If no process software programs execute on the clients the integration proceeds to 230 and exits. If this not the case, then the client addresses are identified 228.

The clients are checked to see if they contain software that includes the operating system (OS), applications, and network operating systems (NOS), together with their version numbers, that have been tested with the process software 229.

The clients are also checked to determine if there is any missing software that is required by the process software 229.

A determination is made as to whether the version numbers match the version numbers of OS, applications and NOS that have been tested with the process software 231. If all of the versions match and there is no missing required software, then the integration proceeds to 230 and exits.

If one or more of the version numbers do not match, then the unmatched versions are updated on the clients with the correct versions 232. In addition, if there is missing required software then it is updated on the clients 232. The client integration is completed by installing the process software on the clients 233. The integration proceeds to 230 and exits.

The process software is shared, simultaneously serving multiple customers in a flexible, automated fashion. It is standardized, requiring little customization and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally the assessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the customer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

The terminology used herein is for the purpose of describing particular embodiments only and is not intended to be limiting of this disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method of characterizing an electromigration (EM) parameter for use in an integrated circuit (IC) chip design, said method comprising:

receiving, by a computer, a layout of a wire layer from said IC chip design;

identifying, by said computer, a signal gate-circuit comprising a signal gate and segments of wires and vias, including electrically parallel paths, connected to an output of said signal gate from said layout of said wire layer;

simulating, by said computer, switching transitions of said signal gate-circuit;

based on widths for each of said segments, determining from stored data of a technology, by said computer, a maximum current of each of said segments at a standard corner of a timing analysis;

calculating, by said computer, an average current output to each of said segments by said signal gate-circuit at said standard corner of said timing analysis;

computing, by said computer, an EM limiting current ratio by dividing said average current of each of said segments by said maximum current of each of said segments;

identifying, by said computer, an EM current limiter from each of said segments based on a highest value of said EM limiting current ratio;

computing, by said computer, a parallel paths uplift factor for a maximum EM current output by dividing a total average current output by said signal gate by said average current of said EM current limiter; and storing in a design library, by said computer, said maximum EM current output, which equals said parallel paths uplift factor multiplied by said maximum current of said EM current limiter.

2. The method of claim 1, said stored data of said technology including a maximum current density for each of said segments at parameters including voltage, temperature, and power-on-hours of said standard corner of said timing analysis.

3. The method of claim 1, said switching transitions comprising a first transition from a first voltage, corresponding to a logical 0, to a second voltage, corresponding to a logical 1, and a second transition from said second voltage to said first voltage.

4. The method of claim 3, said average current being based on a switching factor dependent on a frequency of said switching transitions and a percentage of time during which said switching transitions occur.

5. The method of claim 3, said average current being based on said simulating of said switching transitions.

6. The method of claim 1, said maximum EM current output by said signal gate being stored in said design library as a non-standard extension of a Liberty model.

7. The method of claim 1, further comprising:
based on said widths for each of said segments, determining from said stored data of said technology, by said computer, a maximum root-mean-square (RMS) current of each of said segments at said standard corner of said timing analysis;
calculating, by said computer, an average RMS current output to each of said segments at said standard corner of said timing analysis;
computing, by said computer, an RMS EM current limiting ratio by dividing said average RMS current of each of said segments by said maximum RMS current of each of said segments;
identifying, by said computer, an RMS EM current limiter of said segments based on a highest value of said RMS EM limiting ratio;
computing, by said computer, an RMS parallel paths uplift factor for a maximum RMS EM current output by dividing a total RMS current output by said signal gate by said average RMS current of said RMS EM limiter; and
storing in said design library, by said computer, said maximum RMS EM current output, which equals said RMS parallel paths uplift factor multiplied by said maximum RMS current of said RMS EM current limiter.

8. The method of claim 1, further comprising:
based on said widths for each of said segments, determining from said stored data of a technology, by said computer, a maximum peak current output of each of said segments at said standard corner of said timing analysis;
calculating, by said computer, an average peak current output to each of said segments at said standard corner of said timing analysis;
computing, by said computer, a peak EM current limiting ratio by dividing said average peak current of each of said segments by said maximum peak current of each of said segments;
identifying, by said computer, a peak EM current limiter of said segments based on a highest value of said peak EM current limiting ratio;
computing, by said computer, a peak parallel paths uplift factor for a maximum peak EM current output by dividing a total peak current output by said signal gate by said average peak current of said peak EM current limiter; and
storing in said design library, by said computer, said maximum peak EM current output, which equals said peak parallel path uplift factor multiplied by said maximum peak current of said peak EM current limiter.

9. A computer-implemented method for determining an electromigration (EM) checking limit for an integrated circuit (IC) design flow, said method comprising:
receiving, by a computer, a layout of a wire layer from said IC chip design flow;
identifying, by said computer, a signal gate-circuit comprising a signal gate and segments of wires and vias, including electrically parallel paths, connected to an output of said signal gate from said layout of said wire layer;
reading, by said computer, a maximum output capacitance of said signal gate-circuit at optimal conditions from stored data of a technology;
reading, by said computer, a maximum EM current output for said signal gate-circuit, said maximum EM current output being based on a product of a maximum current through an EM current limiter and a parallel paths uplift factor, which equals a total average current output by said signal gate divided by an average current of said EM current limiter, said EM current limiter being identified by a highest value of an EM limiting current ratio, which equals an average simulated current of switching transitions into each of said segments at a standard corner of a timing analysis divided by a maximum current determined from said stored data of said technology of each of said segments at said standard corner of said timing analysis;
correlating, by said computer, said maximum EM current output by said signal gate to a maximum EM output capacitance of said signal gate; and
selecting, by said computer, a lesser value of said maximum output capacitance of said signal gate at said optimal conditions and said maximum EM output capacitance of said signal gate to be stored as said EM checking limit of said signal gate in a design library for said IC chip design flow.

10. The method of claim 9, further comprising:
reading, by said computer, said EM checking limit of said signal gate stored in said design library;
simulating, by said computer, said switching transitions of said signal gate-circuit, based on an output capacitance value of said signal gate equal to said EM checking limit, to calculate an iterated average current output to each of said segments of said signal-gate circuit at said standard corner of said timing analysis;
computing, by said computer, an iterated EM limiting current ratio by dividing said iterated average current of each of said segments by said maximum current determined from said stored data of said technology of each of said segments at said standard corner of said timing analysis;
identifying, by said computer, an iterated EM current limiter from said segments based on a highest value of said iterated EM limiting current ratio;
computing, by said computer, an iterated parallel paths uplift factor for an iterated maximum EM current output by dividing a total average current output by said signal gate by said iterated average current of said iterated EM current limiter;
computing, by said computer, said iterated maximum EM current output, which equals said iterated parallel paths uplift factor multiplied by said maximum current of said iterated EM current limiter;
correlating, by said computer, said iterated maximum EM current output to an iterated maximum EM output capacitance of said signal gate; and
storing, by said computer, a lesser value of said EM checking limit and said iterated maximum EM output capacitance, as a new EM checking limit of said signal gate in said design library said IC chip design flow.

11. The method of claim 10, said stored data of said technology including a maximum current for each of said segments at parameters including voltage, temperature, and power-on-hours of said standard corner of said timing analysis.

12. The method of claim 10, said average current and said iterated average current being based on a switching factor dependent on a frequency of said switching transitions and a percentage of time during which said switching transitions occur.

13. The method of claim 10, said average current and said iterated average current being based on said simulating of said switching transitions.

14. The method of claim 10, said maximum EM current output and said iterated maximum EM current output by said signal gate being stored in said design library as a non-standard extension of a Liberty model.

15. A computer-implemented method for determining an electromigration (EM) checking limit for an integrated circuit (IC) design flow, said method comprising:
- receiving, by a computer, a layout of a wire layer from said IC chip design flow;
- identifying, by said computer, a signal gate-circuit comprising a signal gate and segments of wires and vias, including electrically parallel paths, connected to an output of said signal gate from said layout of said wire layer;
- reading, by said computer, a maximum output capacitance for said signal gate-circuit at optimal conditions from stored data of a technology;
- based on widths for each of said segments, determining from said stored data of a technology, by said computer, a maximum current of each of said segments at a standard corner of a timing analysis;
- simulating, by said computer, switching transitions of said signal gate-circuit, based on said maximum output capacitance, to calculate an average current output to each of said segments;
- calculating, by said computer, an average current output to each of said segments by said signal gate-circuit based on said maximum output capacitance;
- computing, by said computer, an EM limiting current ratio by dividing said average current of each of said segments by said maximum current of each of said segments;
- identifying, by said computer, an EM current limiter from said segments based on a highest value of said EM limiting current ratio;
- computing, by said computer, a parallel paths uplift factor for a maximum EM current output by dividing a total average current output by said signal gate by said average current of said EM current limiter;
- storing in a design library, by said computer, said maximum EM current output, which equals said parallel paths uplift factor multiplied by said maximum current of said EM limiter;
- correlating, by said computer, said maximum EM current output by said signal gate to a maximum EM output capacitance of said signal gate; and
- selecting, by said computer, a lesser value of said maximum output capacitance of said signal gate at said optimal conditions and said maximum EM output capacitance to be stored as said EM checking limit of said signal gate in said design library for said IC chip design flow.

16. The method of claim 15, further comprising:
- reading, by said computer, said EM checking limit of said signal gate stored in said design library;
- simulating, by said computer, said switching transitions of said signal gate, based on said EM checking limit, to calculate an iterated average current output to each of said segments at said standard corner of said timing analysis;
- computing, by said computer, an iterated EM limiting current ratio by dividing said iterated average current of each of said segments by said maximum current determined from said stored data of said technology of each of said segments at said standard corner of said timing analysis;
- identifying, by said computer, an iterated EM current limiter from said segments based on a highest value of said iterated EM limiting current ratio;
- computing, by said computer, an iterated parallel paths uplift factor for an iterated maximum EM current output by dividing a total average current output by said signal gate by said iterated average current of said iterated EM current limiter;
- computing, by said computer, said iterated maximum EM current output, which equals said iterated parallel paths uplift factor multiplied by said maximum current of said iterated EM limiter;
- correlating, by said computer, said iterated maximum EM current output by said signal gate to an iterated maximum EM output capacitance of said signal gate; and
- storing, by said computer, a lesser value of said EM checking limit and said iterated maximum EM output capacitance, as a new EM checking limit of said signal gate in said design library for said IC chip design flow.

17. The method of claim 16, said stored data of said technology including a maximum current density for each of said segments at parameters including voltage, temperature, and power-on-hours of said standard corner of said timing analysis.

18. The method of claim 16, said switching transitions comprising a first transition from a first voltage, corresponding to a logical 0, to a second voltage, corresponding to a logical 1, and a second transition from said second voltage to said first voltage.

19. The method of claim 16, said average current and said iterated average current being based on a switching factor dependent on a frequency of said switching transitions and a percentage of time during which said switching transitions occur.

20. The method of claim 16, said average current and said iterated average current being based on said simulating of said switching transitions.

* * * * *